United States Patent
Kalhan

(10) Patent No.: US 8,467,336 B2
(45) Date of Patent: Jun. 18, 2013

(54) TRANSMISSION OF SYNCHRONIZATION INFORMATION IN A HETEROGENEOUS WIRELESS COMMUNICATION SYSTEM

(75) Inventor: Amit Kalhan, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 246 days.

(21) Appl. No.: 12/852,276

(22) Filed: Aug. 6, 2010

(65) Prior Publication Data
US 2012/0033622 A1 Feb. 9, 2012

(51) Int. Cl.
*H04W 56/00* (2009.01)
*H04W 84/02* (2009.01)

(52) U.S. Cl.
USPC .......................................... 370/328; 370/329

(58) Field of Classification Search
None
See application file for complete search history.

(56) References Cited

U.S. PATENT DOCUMENTS

| | | | |
|---|---|---|---|
| 2006/0019665 A1* | 1/2006 | Aghvami et al. | 455/444 |
| 2008/0019350 A1* | 1/2008 | Onggosanusi et al. | 370/350 |
| 2009/0225824 A1* | 9/2009 | Noh et al. | 375/240 |
| 2010/0165942 A1* | 7/2010 | Liao et al. | 370/329 |
| 2010/0172267 A1* | 7/2010 | Viorel et al. | 370/254 |
| 2010/0177726 A1* | 7/2010 | Olszewski | 370/329 |
| 2010/0254338 A1* | 10/2010 | Tanaka | 370/329 |
| 2011/0080896 A1* | 4/2011 | Krishnamurthy et al. | 370/336 |

FOREIGN PATENT DOCUMENTS

WO 2009054058 A1 4/2009

* cited by examiner

*Primary Examiner* — Robert Scheibel

(57) ABSTRACT

A communication system includes at least a large service area (LSA) base station and a small service area (SSA) base station. Primary synchronization information is required by mobile communication devices for communication with the LSA and SSA base stations. Secondary synchronization information is required for communication with the LSA base station and tertiary synchronization information is required for communication with the SSA base station. A controller allocates transmission of the primary synchronization information from at least one of the base stations over a physical channel having a defined transmission time and transmission frequency. The controller also allocates transmission of the secondary synchronization information from at least one of the base stations over a second physical channel having a second defined transmission time and second transmission frequency.

15 Claims, 11 Drawing Sheets

TRANSMISSION OF SYNCHRONIZATION INFORMATION IN A HETEROGENEOUS WIRELESS COMMUNICATION SYSTEM

RELATED APPLICATIONS

This application is related to U.S. patent application Ser. No. 12/852,214, entitled "CONTROL CHANNEL ARCHITECTURE", filed concurrently with this application, and incorporated by reference in its entirety herein.

BACKGROUND

The invention relates in general to wireless communication systems and more specifically to control signals in a wireless communication system.

Base stations in cellular communication systems provide communications services to wireless communication devices within geographical cells where each base station exchanges signals with wireless communication devices within an associated cell. The size and shape of each cell and, therefore, the coverage area of the base station are determined by several factors and are at least partially based on design parameters of the base station. In addition to large macro cells that provide services to numerous devices within relatively large geographical areas, some cellular communication systems are increasingly employing smaller cells to increase efficiency, improve coverage, improve the quality of service, and provide additional services. The smaller cells may include a variety of sizes typically referred to as microcells, picocells and femtocells. Microcells and picocells are often implemented within office buildings, shopping centers and urban areas in order to provide additional security, higher user capacity for the area, additional service features, and/or improved quality of service. Femtocells have relatively smaller geographical areas and are typically implemented at residences or small office locations. Since typical cellular backhaul resources may not be available in these locations, femtocells are sometimes connected to the cellular infrastructure through DSL or cable modems. Femtocells are part of the cellular network and, therefore, communicate with the wireless devices using the same techniques as those used by macrocells.

In order for a mobile communication device to receive wireless service from a base station, the mobile communication device must successfully receive synchronization information related to the base station. In many conventional systems, a primary synchronization channel and a secondary synchronization channel are assigned to a base station for transmission of primary synchronization information and secondary synchronization information, respectfully. The primary synchronization information typically includes information related to the sub-frame timing of communications organized into frames and subframes. The sub-frame timing information allows a mobile communication device to determine the times of boundaries between the sub-frames. The secondary synchronization information typically includes information related to the frame timing which allows the mobile communication device to determine the timing within a frame. Accordingly, primary synchronization information provides course timing information of the sub-frame boundaries and the secondary synchronization information provides finer timing information regarding the position within the frame.

The proximity of the various base stations and wireless communication devices often results in interference. In addition to interference of data communications and other control channels, the synchronization channels may also suffer performance degradation due to interference. Further, the same synchronization information is often transmitted by multiple base stations.

SUMMARY

A communication system includes at least a large service area (LSA) base station having a LSA geographical service area and a small service area (SSA) base station having a SSA geographical service area that is smaller than the LSA geographical service area and at least partially overlaps the LSA geographical service area in an overlap region. The LSA base station is configured to provide wireless service to first mobile communication devices which includes exchanging communication data. The SSA base station is configured to provide wireless service to second mobile communication devices which includes exchanging other communication data. Primary synchronization information is required by a mobile communication device for communication with the LSA base station and for communication with the SSA base station. A controller in the system allocates transmission of the primary synchronization information from at least one of the base stations over a physical channel having a defined transmission time and transmission frequency. If transmission of the primary synchronization information is allocated from both base stations, the primary synchronization information is allocated for transmission by the LSA base station and the SSA base station over the first physical channel.

DETAILED DESCRIPTION

The exemplary embodiments discussed below provide efficient allocation of resources for downlink transmission of synchronization information in heterogeneous network systems where mobile wireless communication devices are capable of receiving downlink signals from multiple base stations. In addition to selecting appropriate base stations for transmission of synchronization information, the techniques allow for simultaneous transmission of synchronization information from multiple base stations within a physical channel.

Figure 1A:
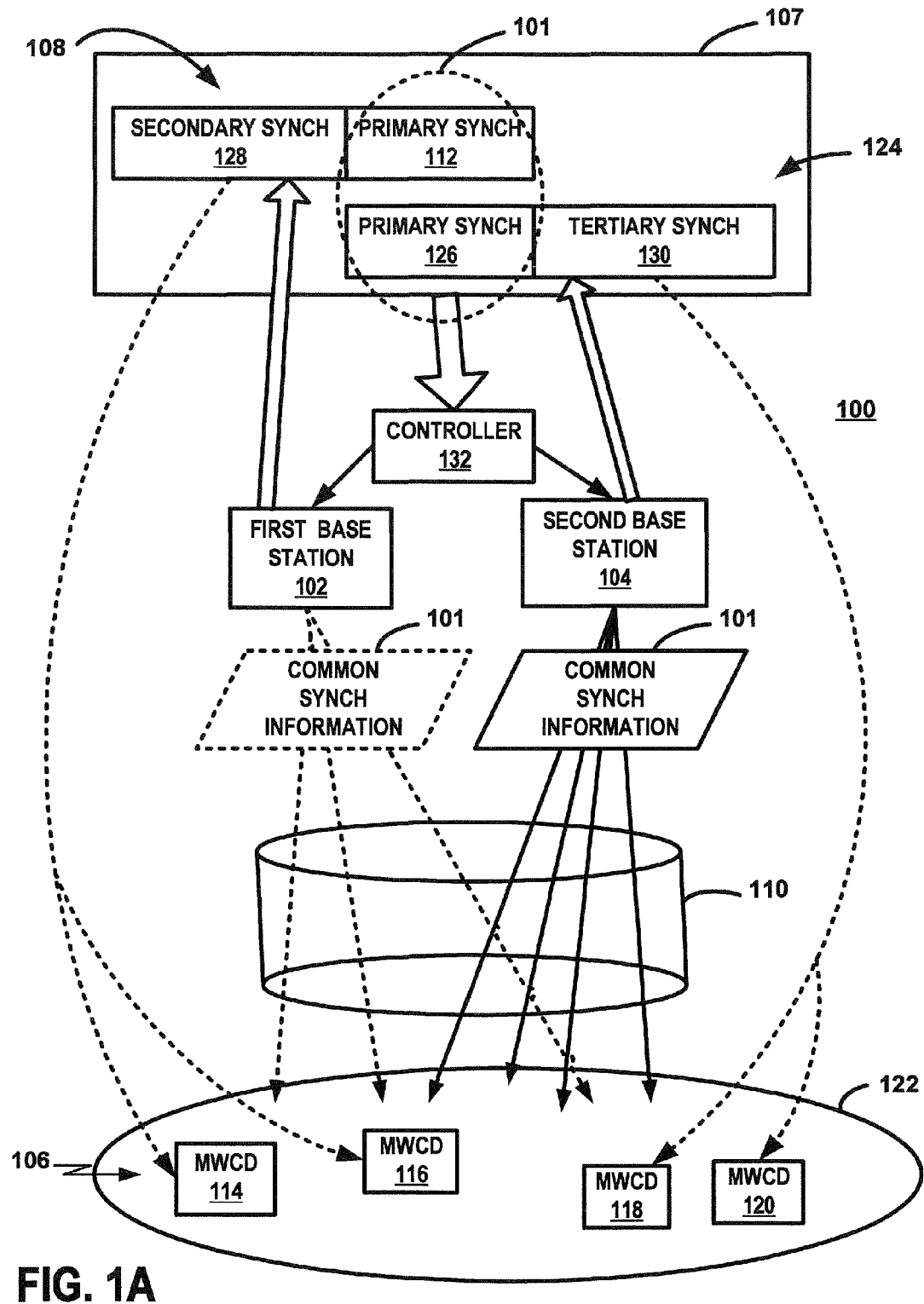
FIG. 1A is a block diagram of a communication system where common synchronization information is transmitted from at least one of two base stations.

FIG. 1A is a block diagram of a communication system where common synchronization information 101 is transmitted from at least one of two base stations 102, 104. The communication system 100 may be implemented in accordance with any of numerous technologies and communication standards. For the examples discussed below, the system 100 operates in accordance with an orthogonal frequency division multiplex (OFDM) standard. The various functions and operations of the blocks described with reference to the communication system 100 may be implemented in any number of devices, circuits, and/or elements as well as with various forms of executable code such as software and firmware. Two or more of the functional blocks in the figures may be integrated in a single device and the functions described as performed in any single device may be implemented over several devices.

The system 100 includes at least two base stations 102, 104 and a wireless communication device. In most circumstances, several base stations are connected to a network controller through network infrastructure to provide wireless communication services to multiple wireless communication devices 106. The mobile wireless communication devices 106 may be referred to as mobile communication devices, mobile devices, wireless devices, mobile wireless devices as well as by other terms. The wireless communication devices 106 include electronics and code for communicating with the base stations and include devices such as cell phones, personal digital assistants (PDAs), wireless modem cards, wireless modems, and laptop computers as well as other devices. For identification purposes, the base stations are referred to as a first base station 102 and a second base station 104. The base stations 102, 104 include wireless transceivers that exchange wireless signals with the wireless communication devices 106. Transmissions from the base stations and from the wireless communication devices 106 are governed by a communication specification that defines signaling, protocols, and parameters of the transmission. The communication specification may provide strict rules for communication and may also provide general requirements where specific implementations may vary while still adhering to the communication specification. Although the discussion below is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical downlink control channels from a base station to a wireless communication device. The control channel includes a logical broadcast control channel 107 as well as device-specific logical control channels (not shown in FIG. 1A). As discussed in further detail below, a first logical control channel 108 associated with the first base station 102 is transmitted over a physical channel 110, where the transmission may be from the first base station 102, from the second base station 104, or from multiple base stations 102, 104. In an OFDM based system, a physical channel can be defined by allocating specific frequency-time resources. The granularity of these resources depends on the specification and design of the system. Although a particular implementation may further specify frequency, timing, and coding parameters for each base station and/or wireless communication device, conventional systems assume that only the base station transmits control data within the defined control channel between the base station and the wireless communication device exchanging data with that particular base station. Further, in conventional systems, the logical control channel corresponding to a base station is transmitted over a physical channel from that base station but only from that base station. Accordingly, in conventional systems, primary synchronization information is always transmitted by each base station. The synchronization information transmitted over physical channels from base stations having overlapping service areas, therefore, is often the same synchronization information in these conventional systems resulting in an inefficient use of resources.

In the examples discussed herein, however, primary synchronization information 112 of the logical control channel 108 corresponding to the first base station 102 may be transmitted by another base station 104 over the physical channel 110. The channel structure allows efficient allocation of physical resources. For example, some wireless communication devices 114, 116, 118, 120 that are receiving wireless service, or attempting to acquire wireless service, from different base stations 102, 104 are within an overlap region 122 of the service areas of both base stations 102, 104. By managing the physical channels from both base stations 102, 104, common synchronization information 101 can be sent by only one of the base stations 104 or may be transmitted by both base stations 102, 104 using intelligent coordination between the two base stations with respect to resources such as time, frequency, codes, and power. Thus, selection of the base station for transmitting particular synchronization information allows for efficient use of the downlink physical resources of both base stations. Accordingly, the additional flexibility allows intelligent use of the resources by taking advantage of mobile communication devices that are within the downlink transmission ranges of multiple base stations. As discussed below, additional efficiencies can be gained by managing the transmission of other synchronization information from the base stations in addition to managing transmission of common synchronization information 101.

The first base station 102 has a first logical control channel 108 and the second base station 104 has a second logical control channel 124. The information within the logical channels 108, 124 and the structure of the logical channels 108, 124 are in accordance with the communication specification governing the operation of the communication system 100. For the example, each logical control channel includes primary synchronization information 112, 126 as well as other synchronization information 128, 130 unique to the particular base station 102, 104. Therefore, in addition to the primary synchronization information 112, 126, the first logical control channel 108 includes secondary synchronization information 128 corresponding to mobile communications only associated with communications with the first base station 102. The second logical control channel 124 includes tertiary synchronization information 130 corresponding to mobile communications with the second base station 104. The primary synchronization information 112 in the first logical channel 108 is identical to the primary synchronization information 126 in the second logical channel 124 for the examples discussed herein. The mobile communications with a base station may include data communications and control information such as synchronization information and may include downlink transmissions to mobile communication devices associated with the base station (serving base station) as well as mobile communication devices not yet associated with the base station (non-serving base station). All mobile communication devices are registered with the network for the examples discussed herein. A mobile communication between the first base station 102 and a mobile communication device 114 may include a resource description of a time-frequency resource carrying particular control information required by a mobile communication device 114 entering the service area (not shown in FIG. 1A) to acquire service from the first base station 104. The dashed lines extending from the box representing the first control information 108 to the wireless communication devices 114, 116 and from the box representing the tertiary synchronization information 130 to the wireless communication devices 118, 120 in FIG. 1A represent the relationship between the base station specific control information and the corresponding mobile communication devices requiring the base station specific control information. For the example of FIG. 1A, first mobile communication devices 114, 116 are in data communication with the first base station 102 and second mobile communication devices 118, 120 are in data communication with the second base station 104. The secondary synchronization information 128 includes synchronization information that is unique to the wireless communication devices 114, 116 associated with the first base station 102 and is different from the tertiary synchronization information 130. Also, the tertiary synchronization information 130 is different from the second synchronization information 128 and is unique to the second base station 104 and the associated wireless communication devices 118, 120.

As described in further detail with reference to FIG. 3A and FIG. 3B, the first base station 102 has a geographical service area that at least partially overlaps a geographical service area of the second base station. The first mobile communication devices 114, 116 and the second mobile communication devices 118, 120 are within the overlap region 122 of the two services areas. Accordingly, all the mobile communication devices 114, 116, 118, 120 within the overlap region 122 can receive signals from both base stations 102, 104.

The primary synchronization information 112 includes relatively course information required by at least all of the wireless communication devices in the overlap region 122. The secondary synchronization information 128 is information required by the wireless communication devices receiving 114, 116 (or attempting to acquire) service from the first base station 102. The secondary synchronization information 128 may also include information that facilitates reception of the tertiary synchronization information 130 by the wireless communication devices receiving 118, 120 (or attempting to acquire) service from the second base station 104. The secondary synchronization information 128 provides a level of synchronization resolution that is higher information than the primary synchronization information 112. In other words, the secondary synchronization information 128 is less course (finer) than the primary synchronization information 112.

The tertiary synchronization information 130 has the same or higher level of resolution (same or finer) than the secondary synchronization information 128 and includes information required for communication with the wireless communication devices receiving 118, 120 (or attempting to acquire) service from the second base station 104.

The primary synchronization information includes at least information related to the sub-frame timing of communications organized into frames and subframes. The sub-frame timing information allows a mobile communication device to determine the times of boundaries between the sub-frames. The secondary synchronization information typically includes information related to the frame timing which allows the mobile communication device to determine the timing within a frame. Accordingly, primary synchronization information provides course timing information of the sub-frame boundaries and the secondary synchronization information provides finer timing information regarding the position within the frame. For the examples discussed herein, the tertiary synchronization information has the same level of coarseness as the secondary synchronization information 128. In some situations, however, the system may be implanted such that the tertiary synchronization information 130 includes additional resolution to the secondary synchronization information 128. For example, the secondary synchronization information, combined with the primary synchronization, may provide sufficient information for a mobile to communicate with the second base station 104 and the tertiary synchronization information may provide additional details regarding the timing or resource location of information unique to the femtocell base station.

Figure 1B:
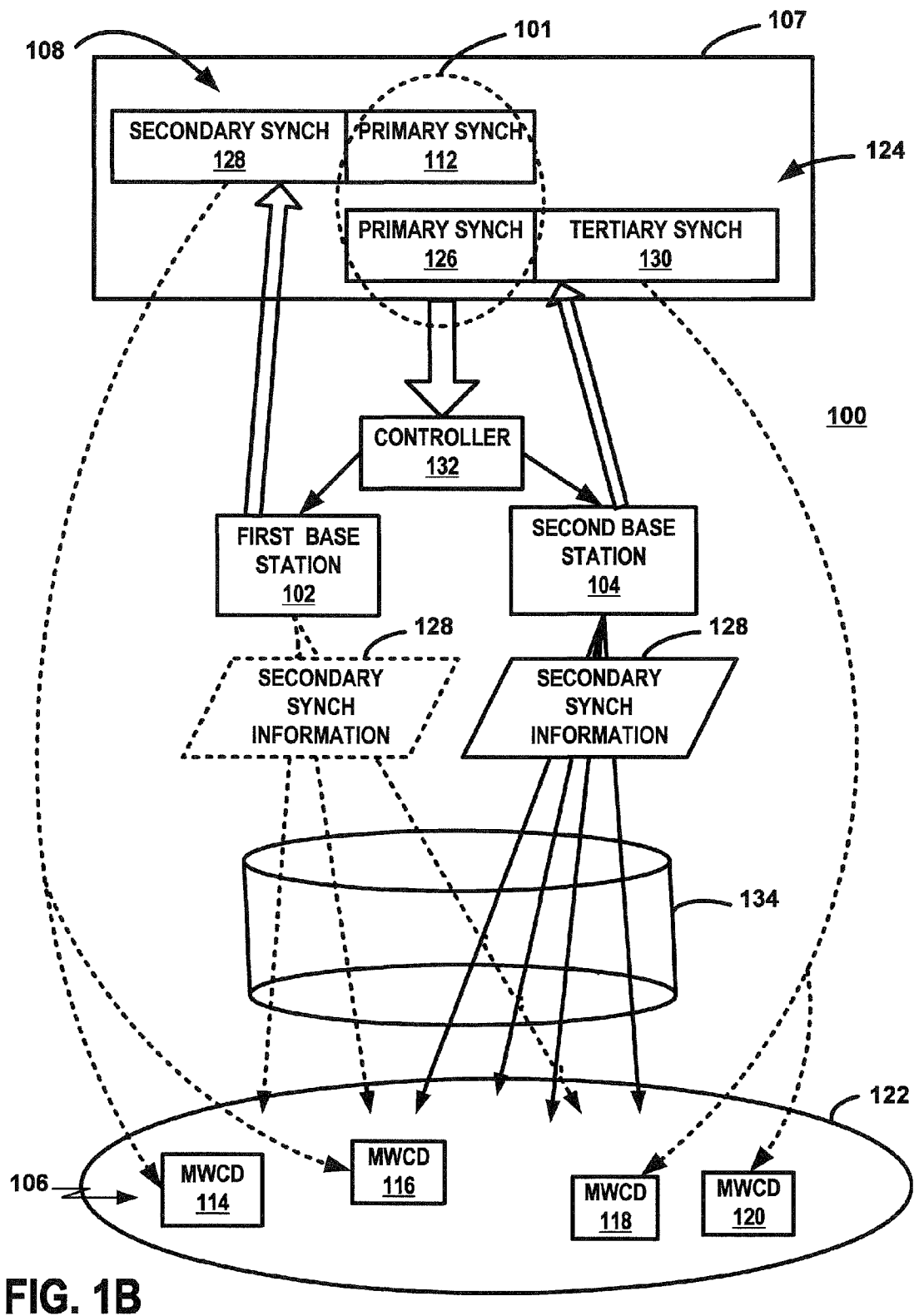
FIG. 1B is a block diagram of the communication system where the secondary synchronization information is transmitted from at least one of two base stations.
Figure 1C:
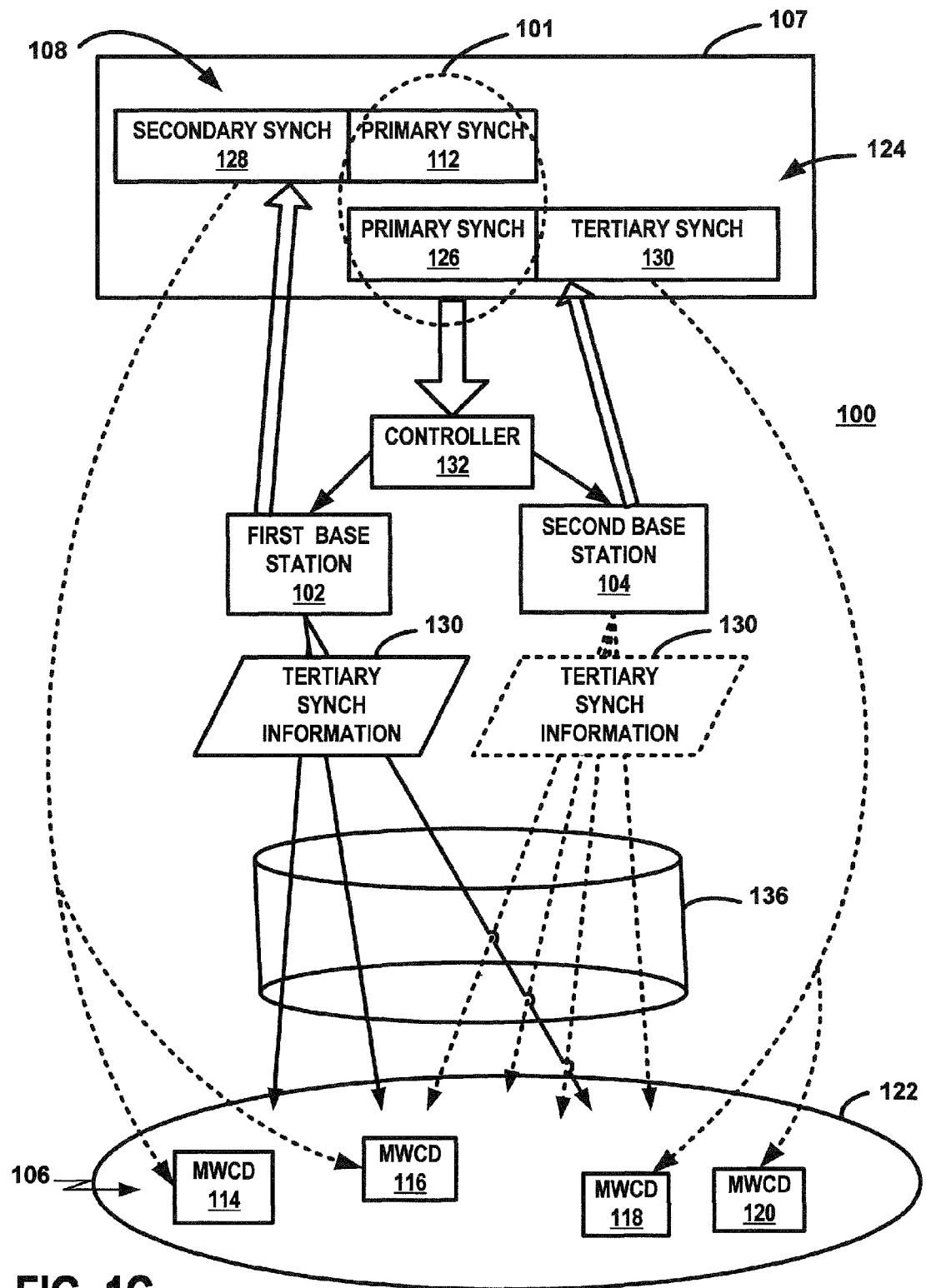
FIG. 1C is a block diagram of the communication system where the tertiary synchronization information is transmitted from at least one of two base stations.

The controller 132 is any combination of hardware, software and/or firmware that performs the described functions. The controller 132 may be located in one of the base stations 102, 104, in the core network (not shown), or may be distributed over the core network and/or base stations 102, 104. Accordingly, one or more devices that may or may not be collocated may perform the functions described as performed by the controller 132. For the example, the controller 132 is within the core network and communicates with the base stations in accordance with known techniques. The controller 132 indentifies the common synchronization information 101 between the first logical control channel 108 and the second logical control channel 124. The controller 132 schedules, maps, or otherwise designates the physical channels that will be used for transmitting the common synchronization information 101 (primary synchronization information 112, 126 in the example), the secondary synchronization information 128 and the tertiary synchronization information 130. FIG. 1A shows transmission of the primary synchronization information 101, 112, 126. FIG. 1B and FIG. 1C show transmission of the secondary synchronization information 128 and tertiary synchronization information 130, respectively. Although the transmission of the primary synchronization information 112, 126, the secondary synchronization information 128 and tertiary synchronization information 130, may occur at the same time, the transmissions are illustrated in separate figures in the interest of reducing complexity in the figures and increasing clarity.

As discussed above, in the described hierarchical synchronization information structure, the primary synchronization information is used to obtain subframe-level timing and the secondary synchronization information is used to obtain frame-level timing. The primary synchronization information, the secondary synchronization information, and the tertiary synchronization information consist of a sequence (typically a pseudo-random sequence) that is transmitted periodically over a fixed set of subcarriers and time (resource elements). The receiver in the mobile device detects these synchronization channels using correlation. If the sequence is sector-specific (e.g. the cell-ID is embedded in the sequence) then the receiver can perform an exhaustive search.

The illustrations in FIG. 1A representing the transmission of the common synchronization information 101 (primary synchronization information 112, 126) from the first base station 102 are drawn using dashed lines to signify that, in some circumstances, the common synchronization information 101 (primary synchronization information 112, 126) is not transmitted from both base stations. In addition to establishing the time and frequency parameters of the physical channel 110 for transmission of the common synchronization information 101, the controller 132 may also establish relative power levels for transmission of the information. As discussed below, the controller 132 weights the subcarriers assigned to transmit the information to select a relative power level of the information. Accordingly, the controller 132 selects a power weighting of the subcarriers for transmitting the common synchronization information 101 from each base station at power weights between a minimum power weighting, where there is no transmission of the information, to a maximum power weight. Any of numerous factors, algorithms, and techniques may be used to determine, whether to transmit the common synchronization information 101 from a particular base station and/or to select the power weighting for the information. Power weighting techniques minimize noise and increase efficiency and capacity of the system. Examples of factors used for determining the power weighting may include signal quality indicators, capacity of the system, and base station loading factors. As discussed below in further detail, for one example, the power weighting is based on a bit error rate (BER) of a combined signal at the wireless communication device where the BER is typically a calculated and predicted value for a wireless communication device within the overlap region 122. Accordingly, for such an implementation, the combined signal is a theoretical signal based on calculations, power levels, attenuation levels and other factors. In some situations, the BER may be a measured BER of a combined signal resulting from actual received signals at a wireless communication device. The measurements may be stored values or may be dynamically processed during operation.

As mentioned above, each base station transmits the same synchronization information over the same physical channel in some situations. Although the same physical channel is used, the base stations may use different scrambling codes for transmission. Accordingly, as discussed herein, a physical channel is a time-frequency physical channel using a particular set of time-frequency resource elements. Two signals transmitted over the same physical channel may include different scrambling. The determination to use different scrambling codes when the same information is transmitted from two base stations depends on several factors such as the length of the codes and the anticipated relative signals strengths of the signals as received at a wireless communication device. For example, where one base station has a coverage area within a building that is located within the coverage area of the other base station, signal loss through the building may be sufficiently high such that the scrambling gain of using different scrambling codes may be adequate to avoid interference. The efficiency of using different scrambling codes is at least partially dependent on the relative power levels of the signals. Where different scrambling codes are used for the two signals, the signals are demodulated and processed separately and then combined. Where the same scrambling code is used, the multiple versions of the simulcast signal are processed by the receiver in the wireless communication device similarly to the processing of reflected signals.

For the examples discussed herein, the same scrambling code is used when the two base stations transmit the same synchronization information over the same physical channel. Accordingly, where the first base station 102 and the second base station 104 both transmit the common synchronization information 101 over the physical channel 110, the signals are scrambled using the same code. Although other techniques may be used, the scrambling codes are based on the cell ID of the base station. Therefore, if the first base station 102 and the second base station 104 are simultaneously transmitting the common synchronization information 101, the base station 102 uses a scrambling code based on the cell ID of the other base station 104 in the exemplary embodiment. A common scrambling code can be used for both signals when transmitting common synchronization information on the physical channel. The receiver combines the signals to achieve a higher signal-to-noise ratio than if only one signal is transmitted. The base stations 102, 104 are sufficiently synchronized to minimize errors and noise. The signals are transmitted by both base stations in situations where the signal quality and efficiency is greater than transmitting the information from only one of the base stations.

FIG. 1B is a block diagram of the communication system 100 where the secondary synchronization information 128 is transmitted from at least one of two base stations. A base station 104 other than the base station (serving base station), or the base station to which the synchronization information corresponds to, may transmit the synchronization information even where the synchronization information is not common synchronization information 101. For example, the secondary synchronization information 128 may be transmitted by the second base station 104 to the wireless communication device 114 that is trying to acquire the first base station 102. Since the wireless communication device 114 is within the overlap region 122, the wireless communication device 114 is able to receive control signals transmitted by the second base station 104. The illustrations in FIG. 1B representing the transmission of the secondary synchronization information 128 from the second base station 104 are drawn using dashed lines to signify that, in some circumstances, the secondary synchronization information 128 may be transmitted from both base stations 102, 104. The controller 132 designates a second physical channel 134 that will be used for transmitting the secondary synchronization information 128. A transmission of the secondary synchronization information 128 is over the second physical channel 134. Where both base stations 102, 104 transmit the secondary synchronization information 128, signals are simultaneously transmitted over the second physical channel 134. Accordingly, the same information is transmitted over the same physical channel. As discussed above, the signal from one base station may be scrambled differently from the other base station in some situations.

FIG. 1C is a block diagram of the communication system 100 where the tertiary synchronization information 130 is transmitted from at least one of two base stations 102, 104. A base station 102 other than the base station 104 to which the synchronization information pertains may transmit the tertiary synchronization information 130 for the wireless communication device 118 even where the synchronization information is not common synchronization information 101. For example, the tertiary synchronization information 130 may be transmitted by the first base station 102 to the wireless communication device 118 that is in data communication with the second base station 104. Since the wireless communication device 118 is within the overlap region 122, the wireless communication device 118 is able to receive control signals transmitted by the first base station 102. The illustrations in FIG. 1C representing the transmission of the tertiary synchronization information 130 from the first base station 102 are drawn using dashed lines to signify that, in some circumstances, the tertiary synchronization information 130 may be transmitted from both base stations. The controller 132 applies power weightings for each base station for transmitting each of the common synchronization information 101 (112, 126), the secondary synchronization information 128 and the tertiary synchronization information 130. The controller assigns the transmission of the tertiary synchronization information 130 over a third physical channel 136.

Figure 2A:
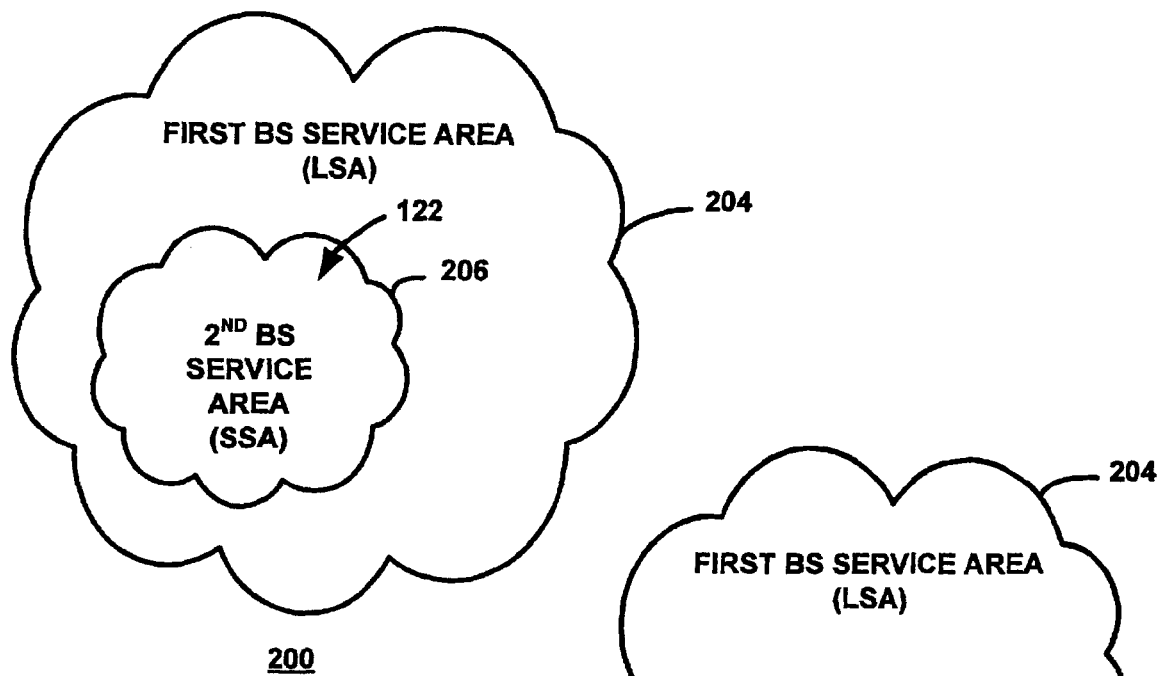
FIG. 2A is a depiction of an exemplary geographical service area relationship provided by the first base station and the second base station where the service area of the second base station is within the service area of the first base station.
Figure 2B:
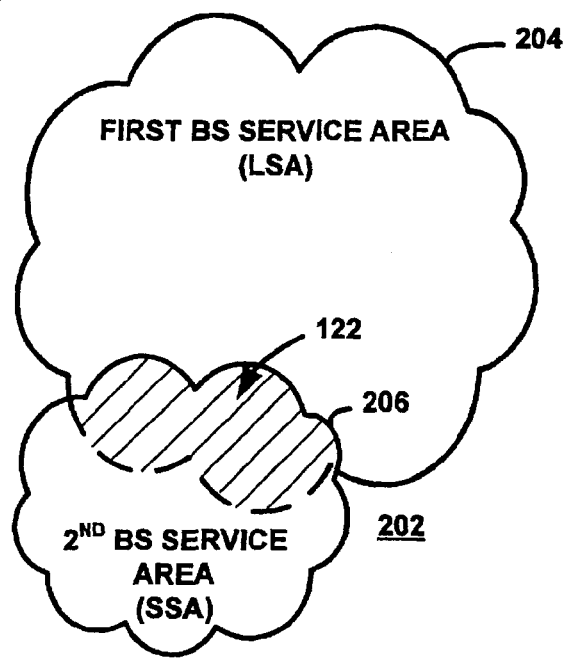
FIG. 2B is a depiction of an exemplary geographical service area relationship provided by the first base station and the second base station where the service area of the second base station overlaps with the service area of the first base station.

FIG. 2A and FIG. 2B are depictions of exemplary geographical service area relationships 200, 202 provided by the first base station 102 and the second base station 104. The first base station 102 is capable of providing wireless service to wireless communication devices within a first base station geographic service area 204 and the second base station 104 is capable of providing wireless service to wireless communication devices within a second station geographical service area 206. Accordingly, a geographic service area is the coverage area of the base station. The second base station geographical service area 306 and the first base station geographic service area 204 may have any of numerous shapes, sizes, and configurations. The clouds representing the service areas generally illustrate the relationships between the service areas and do not necessarily depict the actual shapes of the service areas. Further, the service areas may contain holes of coverage where service is unavailable. In the interest of clarity and brevity, such features are not illustrated in the figures. In FIG. 2A, the service area 206 of the second base station 104 is completely within the service area 204 provided by the first base station 102. Such service area relationships 200 often occur where some base stations within the communication system provide smaller service regions such as microcell, picocell, and femtocell configurations. A femtocell arrangement, for example, may include a femtocell base station (second base station 104) located at a residence where the femtocell is a service area for devices used by device users living at the residence. When the wireless communication devices are outside the service area 206, service is provided by larger macrocells (e.g. first base station 104). When the authorized wireless communication device is at the residence, however, service is provided by the base station presenting the smaller femtocell service area 204. Accordingly, in most situations, the service area 204 of the second base station 102 will be completely within the service area 204 of the first base station 104. In some situations, however the service area 206 may be partially overlapping with the service area 204 as shown in FIG. 2B.

An example of a heterogeneous network system that included multiple sized and overlapping service areas includes systems that operate in accordance with 3GPP LTE communication specification and include one or more of macrocells, microcells, picocells and femtocells. In such systems, the base stations are typically referred to as eNodeBs. Continuing with the example of FIG. 2A and FIG. 2B, therefore, the first base station 102 may be an eNodeB with a geographical service area greater than the geographical service area of an eNodeB that is operating as the second base station 104. Accordingly, a larger service area (LSA) eNodeB, such a macro eNodeB has a larger service area than a smaller service area (SSA) eNodeB such as a Micro eNodeB, Pico eNodeB, or Femto eNodeB. As discussed herein, a larger service area (LSA) base station is any type of base station or eNodeB that provides communication services within a larger service area than a smaller service area (SSA) base station where the SSA base station is any type of base station or eNodeB providing service within the smaller service area.

Figure 3A:
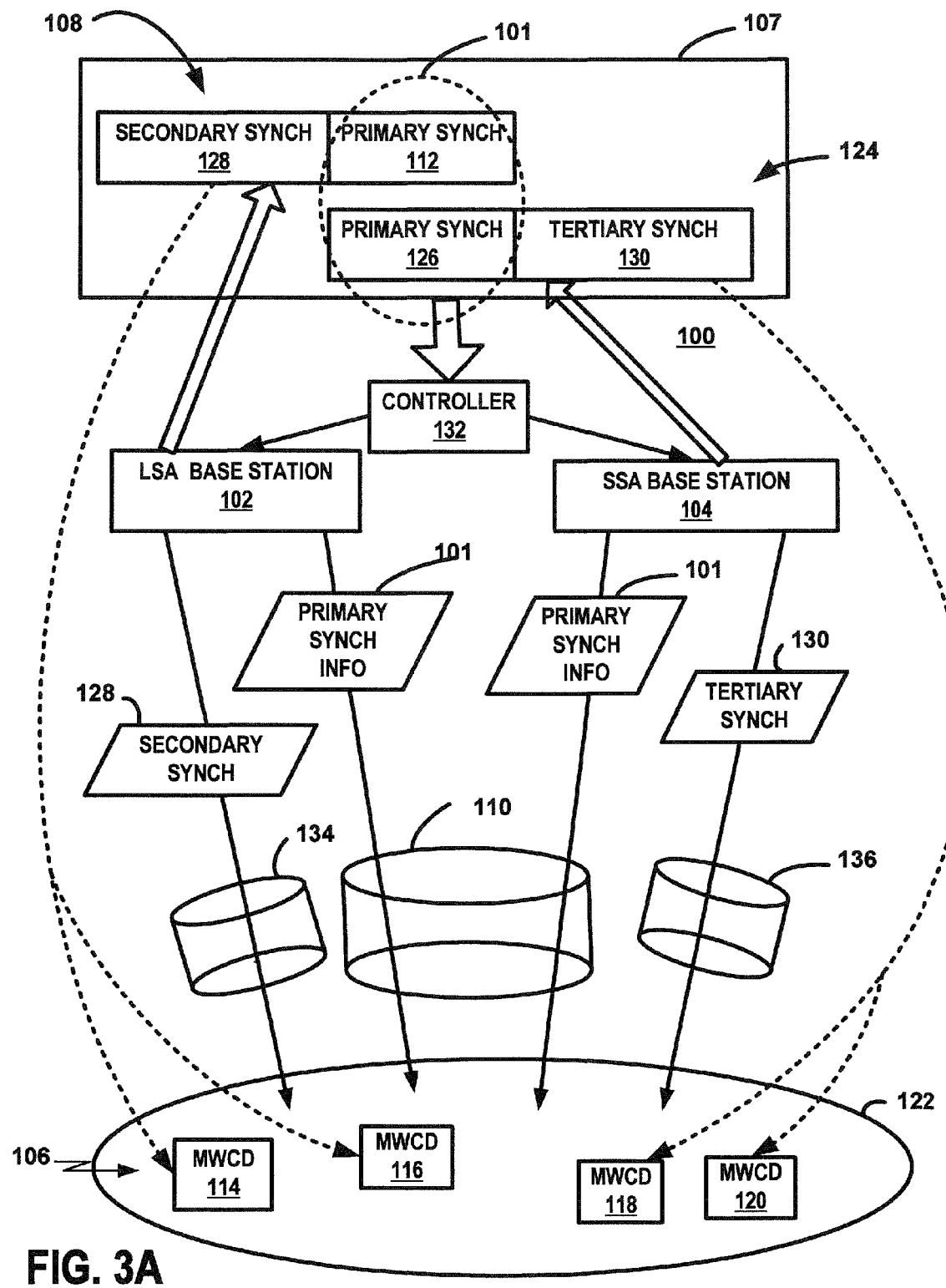
FIG. 3A is a block diagram of the communication system where the common synchronization information is transmitted by the LSA base station and a SSA base station, the secondary synchronization information is transmitted by the LSA base station and the tertiary synchronization information is transmitted by the SSA base station.

FIG. 3A is a block diagram of the communication system 100 where the common synchronization information 101 (primary synchronization information 112, 126) is transmitted by the LSA base station 102 and a SSA base station 104, the secondary synchronization information 128 is transmitted by the LSA base station 102 and the tertiary synchronization information 130 is transmitted by the SSA base station 104. For the example of FIG. 3A, therefore, the primary synchronization information 112, 126 is transmitted from both base stations 102, 104. Appropriate weightings are applied to the transmissions maximize efficiency and minimize noise as discussed herein. The primary synchronization information is transmitted by both base stations through the first physical channel 110. The secondary synchronization information 128 is transmitted by the LSA base station through the second physical channel 134. The tertiary synchronization information 130 is transmitted by the SSA base station through the third physical channel 136.

Figure 3B:
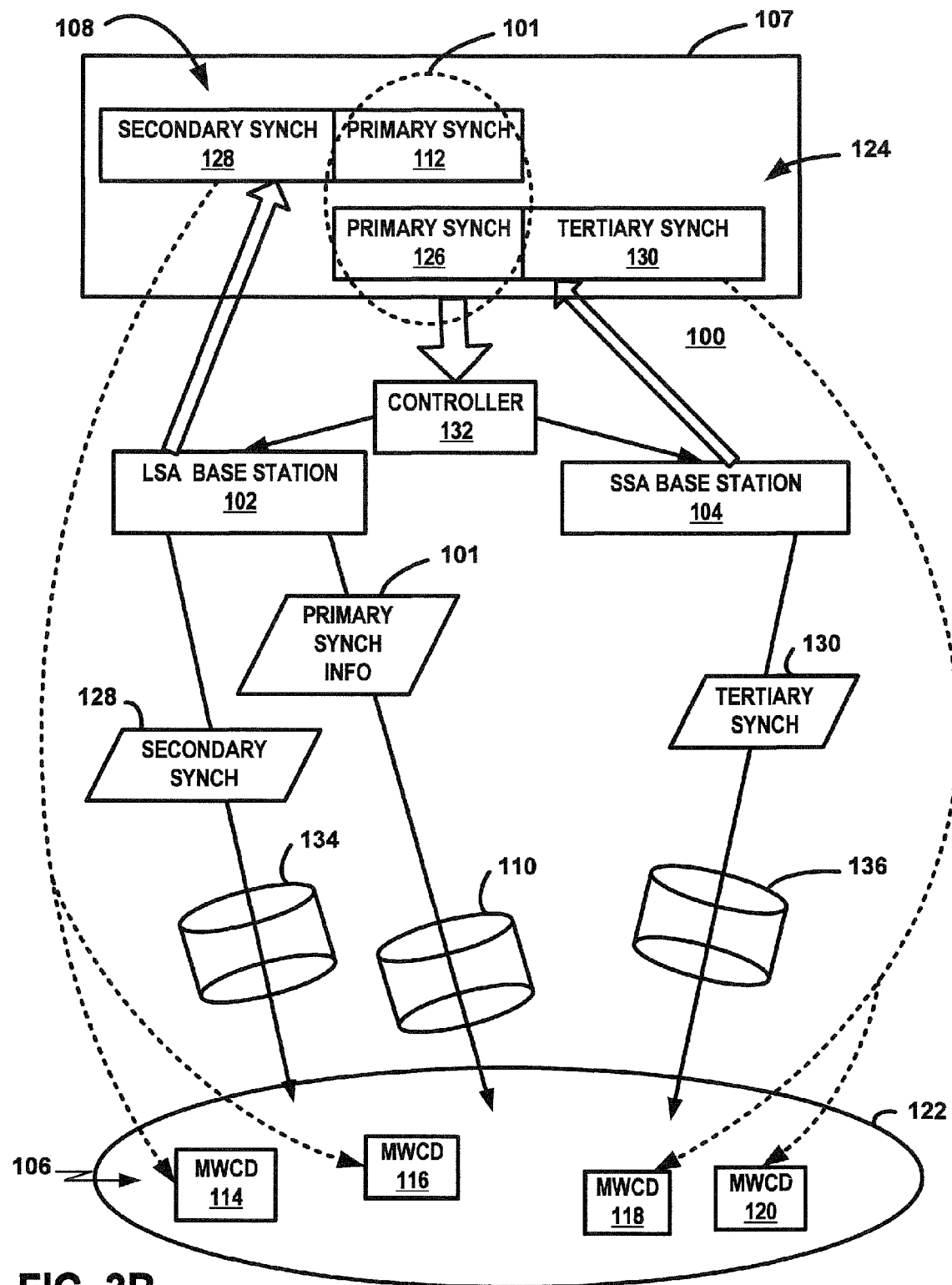
FIG. 3B is a block diagram of the communication system where the common synchronization information is transmitted only by the LSA base station, the secondary synchronization information is transmitted only by the LSA base station, and the tertiary synchronization information is transmitted only by the SSA base station.

FIG. 3B is a block diagram of the communication system 100 where the common synchronization information 101 (primary synchronization information 112, 126) is transmitted only by the LSA base station 102, the secondary synchronization information 128 is transmitted only by the LSA base station 102, and the tertiary synchronization information 130 is transmitted only by the SSA base station 104. For the example of FIG. 3B, therefore, the primary synchronization information 126 associated with the SSA base station 104 is transmitted by the LSA base station 102. The secondary synchronization information 128 is transmitted by the LSA base station through the second physical channel 134. The tertiary synchronization information 130 is transmitted by the SSA base station through the third physical channel 136.

Figure 4:
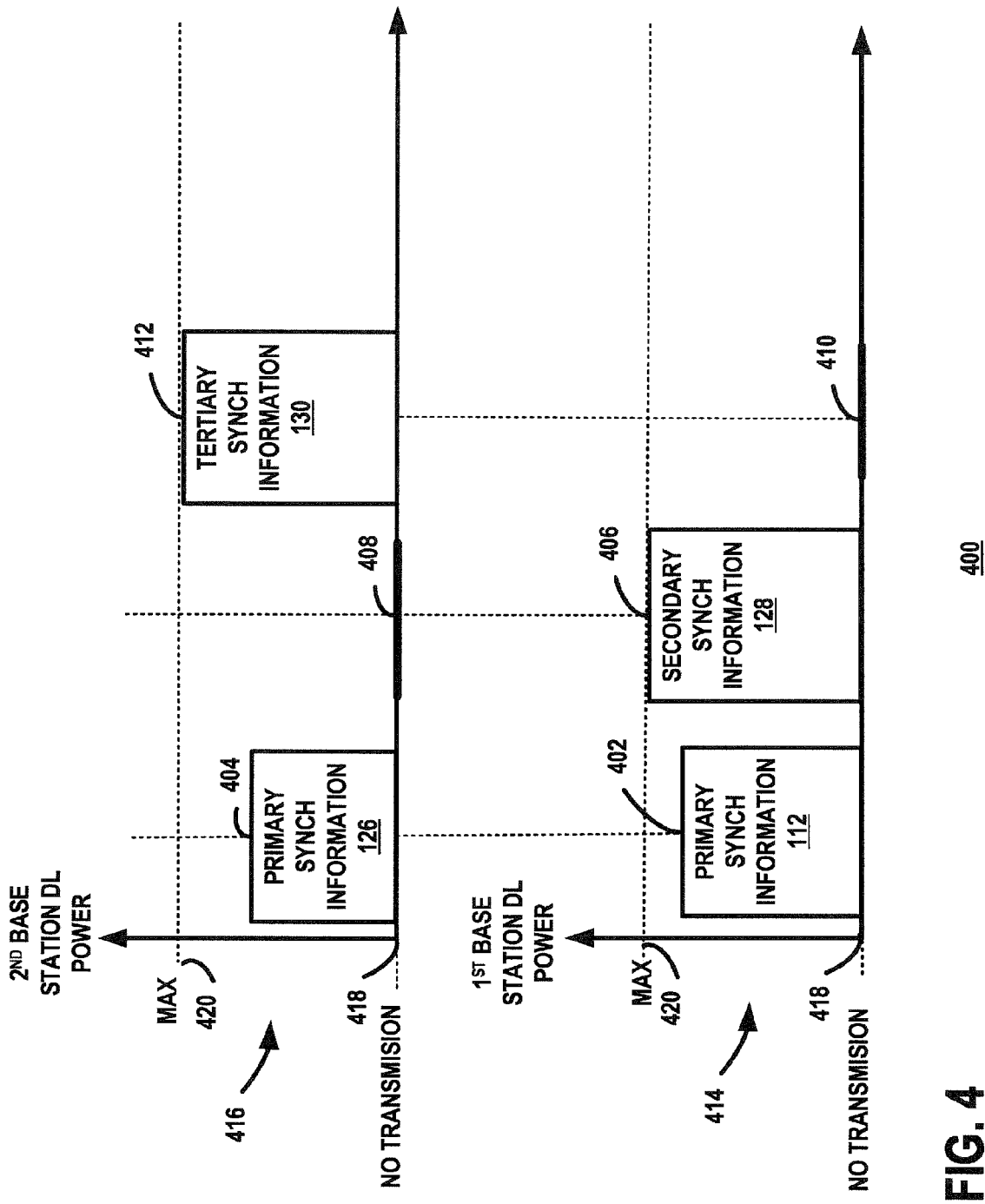
FIG. 4 is a graphical representation of an example of transmission power levels of the transmissions of the synchronization information from the two base stations.

FIG. 4 is a graphical representation 400 of an example of transmission power weighting 402, 404, 406, 408, 410, 412, of the transmissions 414, 416 of the synchronization information from the two base stations 102, 104. In embodiments discussed herein, a power loading scheme is used to allocate power across the subcarriers. In accordance with OFDM techniques, power is allocated using power-loading techniques where power is increased over some subcarriers and decreased over others while maintaining a constant energy over the full frequency band although the overall power in the full frequency band can also be adjusted, in some circumstances.

The power allocation in power-loading systems can be expressed as $x_i = \alpha_i s_i$ where $\alpha_i$ is a weight on the i-th subcarrier and $s_i$ is the transmitted symbol (complex-valued). The vector $\alpha = [\alpha_1, \alpha_2, \ldots, \alpha_{N-1}, \alpha_N]^T$ is designed to meet the following constraint:

$$E\left[\left|\sum_{i=1}^{N} \alpha_i \ s_i\right|^2\right] = \sum_{i=1}^{N} |\alpha_i|^2 E[|s_i|^2] = \varepsilon \text{ and,}$$

$$\text{as a result, } \|\alpha\|_2 = \left(\sum_{i=1}^{N} |\alpha_i|^2\right)^{1/2} = 1$$

Various algorithms are applied to simultaneously adjust the corresponding bit-rate, $R_i$ (e.g. modulation order) and the power parameter, $\alpha_i$, for each subcarrier (or set of subcarriers)

to optimize the system performance. Such a process is typically referred to as "loading" in OFDM systems.

Therefore, allocating various weights $\alpha_i$ in the frequency-domain allows power to be increased on certain parts of the frequency band while decreased on certain other parts of the frequency band. As mentioned above, however, the total base station (eNodeB) transmission power is fixed. Therefore, if power spectral density is increased on part of the bandwidth, less power is available for the remaining part of the bandwidth.

In typical OFDM based implementations, each base station performs power and bit-rate allocation per subcarrier (or a set of subcarriers) before the inverse fast Fourier transform (IFFT) operation (frequency-domain). Each base station may be assigned a different power level. Therefore, after IFFT operation, digital-to-analog and RF processing, each base station may transmit the signal at a different power level. Such a situation may occur where the base stations provide service in different sized service areas. A larger service area (LSA) base station is typically assigned a higher maximum power level than a smaller service area (SSA) base station. For example, during the final stages of transmission, a power amplifier of a macro base station transmits at 43 dBm and a power amplifier for a pico base station transmits at 30 dBm. The power amplifiers transmit a time-domain based signal where all frequencies are amplified. Due to power-allocation applied during the frequency-domain stage, however, each frequency gets amplified by a different factor. As exemplified herein, therefore, the assignment of a transmission power level (weighting) to control information is at least partially accomplished by shifting power, in the frequency domain, to or from subcarriers used for transmitting the control information. This procedure is referred to herein as subcarrier power weighting.

The graphical representation 400 is most illustrative of power weighting of subcarriers carrying the synchronization information in the frequency domain before the IFFT operation, amplification, and transmission. Those skilled in the art will recognize the correspondence to the frequency spectrum in the time domain during transmission. In addition, the actual power of the transmitted signals may be further adjusted or determined by other factors. For example, the maximum power level of particular base stations may be limited to achieve a particular geographical coverage mapping. Accordingly, the illustrations in FIG. 4 relate to the subcarrier power weighting which do not necessarily directly correspond to the actual transmitted power from the base stations.

The controller 132 selects a power weighting 402, 404 for transmitting signals that will include the primary synchronization information 112, 126 from each base station 102, 104 at power weightings between no power 418, where there is no transmission of the signal, to a maximum power weighting 420. For the example of FIG. 7, therefore, the transmission 414 from the first base station 102 includes a primary synchronization signal 112 that has a power weighting 402 less than the maximum 420. The transmission 416 from the second base station 104 includes a primary synchronization signal 126 that has a power weighting 804 less than the maximum 420 but different than the power level 402 from the first base station 102.

The controller 132 selects a power weighting 406, 408 for transmitting signals that will include the secondary synchronization information 128 from each base station 102, 104 at power levels between a minimum weighting 418, where there is no transmission of the signal, to a maximum power weighting 420. For the example of FIG. 4, therefore, the transmission 414 from the first base station 102 includes a secondary synchronization signal 128 that has a power weighting 406 at the maximum 420. The transmission 416 from the second base station 104 does not include a secondary synchronization signal 128. Accordingly, the power weighting 408 of the secondary synchronization signal 128 transmitted from the second base station is zero power. Transmitting the information at a zero weighting can be achieved by not assigning the information to any subcarriers for transmission.

The controller 132 selects a power weighting 410, 412 for transmitting signals that will include the tertiary synchronization information 130 from each base station 102, 104 at power levels between a zero power weighting 418, where there is no transmission of the information, to a maximum power weighting 420. For the example of FIG. 4, therefore, the transmission 416 from the second base station 104 includes a tertiary synchronization signal 130 that has a power level 412 at the maximum 420. The transmission 414 from the first base station 102 does not include a tertiary synchronization signal 130. Accordingly, the power weighting 410 of the tertiary synchronization signal 130 transmitted from the first base station is a zero weighting (no transmission).

Numerous other transmission schemes and power weighting can be used based on the particular communication system 100 and situation. Power weighting for synchronization signals, as with other control channels, are typically determined at the time of system deployment. Power weighting may be dynamic, however, in some situations.

One example for setting the power weightings for the common synchronization information 101 includes setting the power weighting of the primary synchronization channel of the SSA area base station as a function of the power weighting of primary synchronization channel of the LSA base station. The power weightings may be pre-determined to provide static or semi-static settings. Although the function may be any of numerous functions, an example of a suitable function is a linear function such as PWSSA=PWLSA*K, where PWSSA is the power weight of the subcarriers transmitted from the SSA base station, PWLSA is the power weighting of the subcarriers transmitted from the LSA base station, and K is a weighting factor. K can be a constant determined at deployment or may be semi-static where the value of K may be readjusted after deployment depending on conditions. For one example, K is selected to minimize the bit error rate (BER) of a combined signal at a receiver within the overlap region 122 as determined at the time of deployment. If, for example, Y is power level of a combined signal, Y can be represented as Y=a*PWLSA+K*b*PWLSA, where a is the propagation loss anticipated for signals transmitted from the LSA base station and b is the propagation loss anticipated for signals transmitted from the SSA base station. K is selected to achieve a minimum power ($Y_{MIN}$) that results in a maximum acceptable bit error rate (BER). Although other values may be used, a desirable BER is often selected to be less than one percent. Accordingly, K is selected to achieve a Y>$Y_{MIN}$ in order that the BER <1%. The determination of the Y, $Y_{MIN}$, a, b and other factors are performed in accordance with known techniques and may be performed by measurements, calculations, simulations, channel modeling and combinations thereof. Numerous other transmission schemes and power levels can be used based on the particular communication system 100 and situation. Power weightings for system-wide and sector-specific control information are typically determined at the time of system deployment. Power weighting may be dynamic, however, in some situations. In addition to BER, false-detection probabilities can be used to designing the power weighting scheme for synchronization channels and other acquisition channels.

Figure 5:
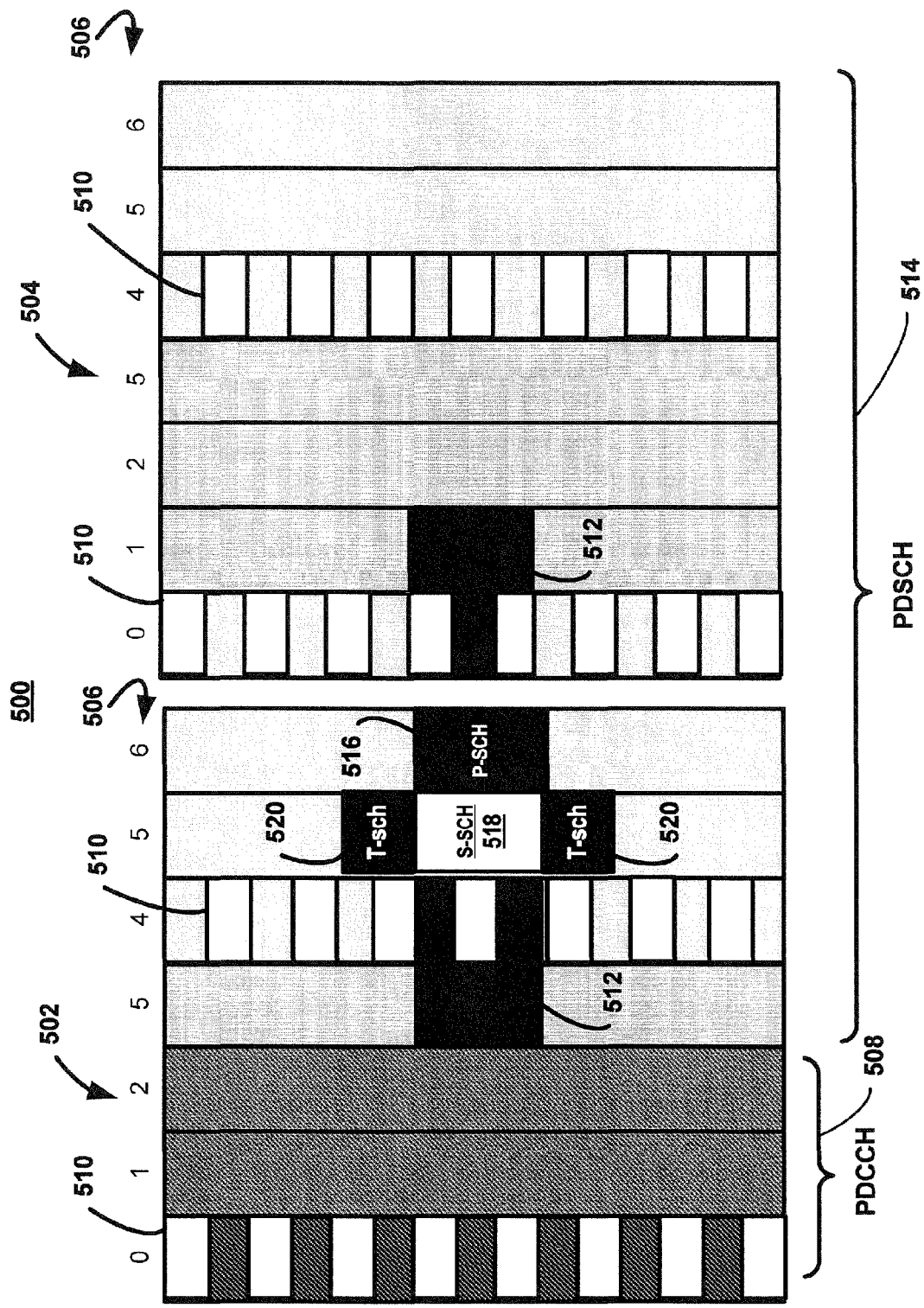
FIG. 5 is an illustration of a subframe that includes a tertiary synchronization channel in accordance with a 3GPP LTE communication specification.

FIG. 5 is an illustration of a subframe 500 that includes a tertiary synchronization channel in accordance with a 3GPP LTE communication specification. The subframe 500 includes two slots 502, 504, where each slot includes seven symbol times 506. The symbol times 0, 1 and 2 in the first slot 502 form a Physical Downlink Control Channel (PDCCH) 508. Pilot signals (or Reference Signals) 510 are injected at symbol times 0 and 4. The subframe 500 includes a Physical Broadcast Channel (PBCH) 512 and spans portions of symbol times 3 and 4 of the first slot 502 and portions of symbol times 0 and 1 of the second slot 504. A data channel is a Physical Downlink Shared Channel (PDSCH) 514 and is covered by the remainder of symbol times 3-6 of the first slot 502 and symbol times 1-6 of the second slot 504. The subframe 500 also includes a primary synchronization channel (P-SCH) 516 and a secondary synchronization channel (S-SCH) 518 as well as a tertiary synchronization channel 520. Conventional systems include only a primary synchronization channel (P-SCH) 516 and a secondary synchronization channel (S-SCH) 518. The tertiary synchronization channel 520 in the example is shown as two resource blocks adjacent to the S-SCH 518. The tertiary synchronization channel 520, however, may be defined within other time-frequency resources within the subframe 500. The distribution and assignment of resource elements depicted in FIG. 5 are provided as an example. Other combinations of resource blocks and resource elements may be used. Although the example illustrates the use of non-consecutive resource elements, there may be advantages to assigning consecutive resource to the tertiary synchronization information.

Figure 6:
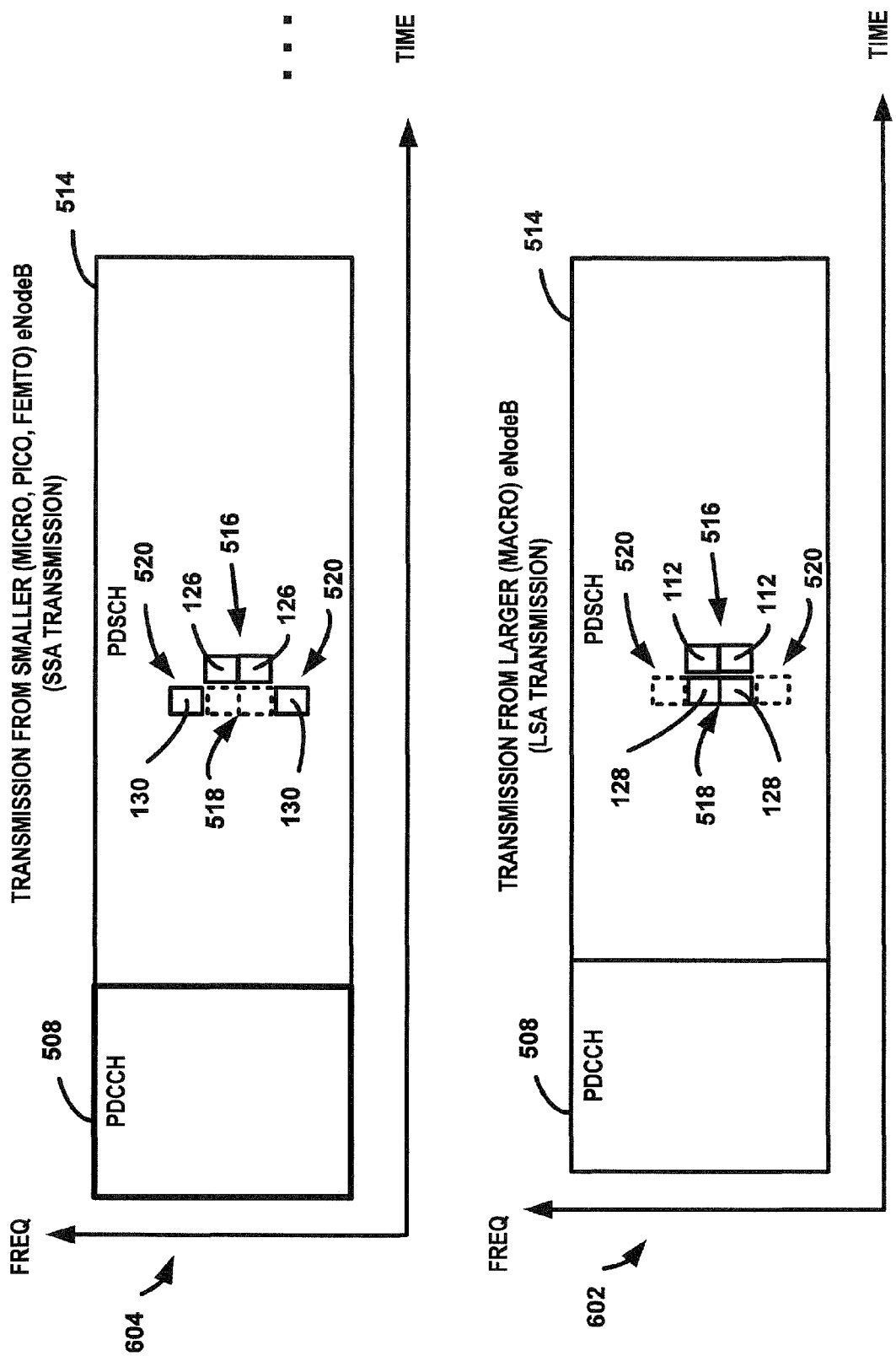
FIG. 6 illustrates an example consistent with the power allocation shown in FIG. 4.

FIG. 6 is graphical illustration 600 of the transmissions 414, 416 where the first base station 102 and the second base station 104 operate in accordance with a 3GPP LTE communication specification. For the example of FIG. 6, the first base station 102 is an eNodeB with a LSA geographical service area 204 greater than SSA geographical service area 206 of an eNodeB that is operating as the second base station 104. Accordingly, the LSA eNodeB, such a macro eNodeB has a larger service area than the SSA eNodeB such as a Micro eNodeB, Pico eNodeB, or Femto eNodeB.

For the example of FIG. 6, the first base station transmission is the larger service area eNodeB transmission (LSA transmission) 602 and the second base station transmission is the smaller service area eNodeB transmission (SSA transmission) 604 where the transmissions are formatted and transmitted in accordance with the 3GPP LTE communication specification. Therefore, the physical device-specific control channel is a Physical Downlink Control Channel (PDCCH) 508 and the data channel is a Physical Downlink Shared Channel (PDSCH) 514 for this example. The common synchronization information 101, the secondary synchronization information 128 and the tertiary synchronization information 130 are transmitted over the BCH 812. The primary synchronization information 502 is transmitted over the P-SCH 516 and the secondary synchronization information 504 is transmitted over the S-SCH 518. The tertiary synchronization information 130 is transmitted over the tertiary synchronization channel (T-SCH) 520.

FIG. 6 illustrates an example consistent with the power allocation shown in FIG. 4. For example, the resource elements representing the P-SCH 516 having the primary synchronization information 112, 126 are represented with sold-line blocks in both transmissions to illustrate that the signals are transmitted from both base stations (eNodeBs) 102, 104. The resource elements representing the S-SCH with the secondary synchronization information 128 are represented with sold-line blocks in the first base station transmission 602 and with dashed lines in the second base station transmission 204 to illustrate that the signals are transmitted only from the first base station (LSA eNodeB) 102. The resource elements representing the tertiary synchronization channel 520 with the tertiary synchronization information 130 are represented with sold-line blocks in the second base station transmission (SSA transmission) 604 and with dashed lines in the first base station transmission (LSA transmission) 602 to illustrate that the signals are transmitted only from the second base station (SSA eNodeB) 104.

For the example, the secondary synchronization information 128 and the tertiary synchronization information 130 are allocated orthogonal resources for transmission by one of the base stations. The primary synchronization information 112, 126 (common synchronization information 101) is transmitted over the same, non-orthogonal, resource from both base stations.

Figure 7:
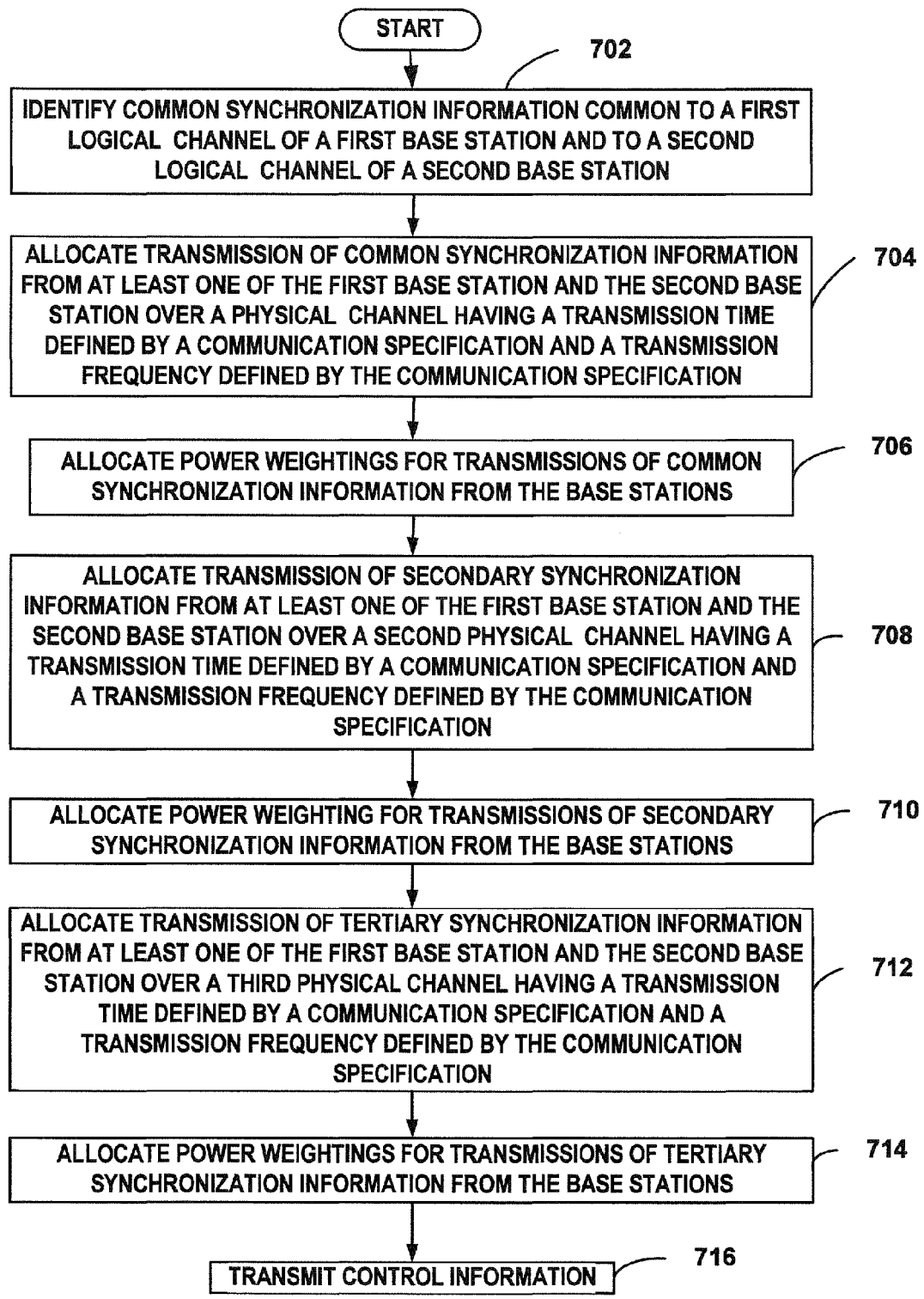
FIG. 7 is a flow chart of a method performed in the communication system.

FIG. 7 is a flow chart of a method performed in the communication system 100. Although the method may be performed using any combination of code and/or hardware, the method is facilitated by executing code on the controller 132 in the exemplary embodiment.

At step 702, the common synchronization information 101 is identified. The controller 132 determines what synchronization information of the first logical channel 108 is the same as the information in the second logical channel 124.

At step 704, transmission of the common synchronization information 101 is allocated from at least one of the first base station 102 and the second base station 104. The common synchronization information 101 is allocated for transmission from one or both of the base station 102, 104 over the physical channel 110. As discussed above, the physical channel 110 has defined time and frequency resources. Where the common synchronization information 101 is allocated for transmission over both base stations 102, 104, the transmission is allocated from both base stations over the physical channel 110.

At step 706, power weightings for transmitting the common synchronization information 101 are allocated. As discussed above, the controller 132 determines appropriate power weightings for transmitting the common synchronization information 101 from each base station 102, 104. In some cases, the common synchronization information 101 is only transmitted from one base station and the power weighting for transmission from the other base station is zero power (no power). The power levels are typically determined at the time of system deployment and are at least partially based on the distance between the base stations 102, 104. In some situations the power levels may be dynamically adjusted based on other factors.

At step 708, transmission of the secondary synchronization information 128 is allocated for transmission from at least one of the first base station 102 and the second base station 104. The secondary synchronization information 128 is allocated for transmission from one or both of the base station 102, 104 over the second physical channel 134. As discussed above, the second physical channel 134 has time and frequency resources defined by a communication specification. Where the secondary synchronization information 128 is allocated for transmission over both base stations 102, 104, the transmission is allocated from both base stations over the second physical channel 134.

At step 710, power weightings for transmitting the secondary synchronization information 128 are allocated. As discussed above, the controller 132 determines appropriate power weightings for transmitting the secondary synchronization information 128 from each base station 102, 104. In some cases, the secondary synchronization information 128 is only transmitted from one base station and the power weighting for transmission from the other base station is zero power (no power). The power weightings are typically determined at the time of system deployment and are at least partially based on the distance between the base stations 102, 104. In some situations the power weightings may be dynamically adjusted based on other factors.

At step 702, transmission of the tertiary synchronization information 130 is allocated for transmission from at least one of the first base station 102 and the second base station 104. The tertiary synchronization information 130 is allocated for transmission from one or both of the base station 102, 104 over the third physical channel 136. As discussed above, the third physical channel 136 has time and frequency resources defined by a communication specification. Where the tertiary synchronization information 130 is allocated for transmission over both base stations 102, 104, the transmission is allocated from both base stations over the third physical channel 136.

At step 714, power weightings for transmitting the tertiary synchronization information 128 are allocated. As discussed above, the controller 132 determines appropriate power weightings for transmitting the tertiary synchronization information 130 from each base station 102, 104. In some cases, the tertiary synchronization information 130 is only transmitted from one base station and the power weighting for transmission from the other base station is a zero weighting (no transmission). The power weightings are typically determined at the time of system deployment and are at least partially based on BER of a combined signal received at a mobile communication device within the overlap region. In some situations the power weightings may be dynamically adjusted based on the same criteria as well as other factors.

At step 716, the control information is transmitted at the allocated power weightings and base station(s).

Figure 8:
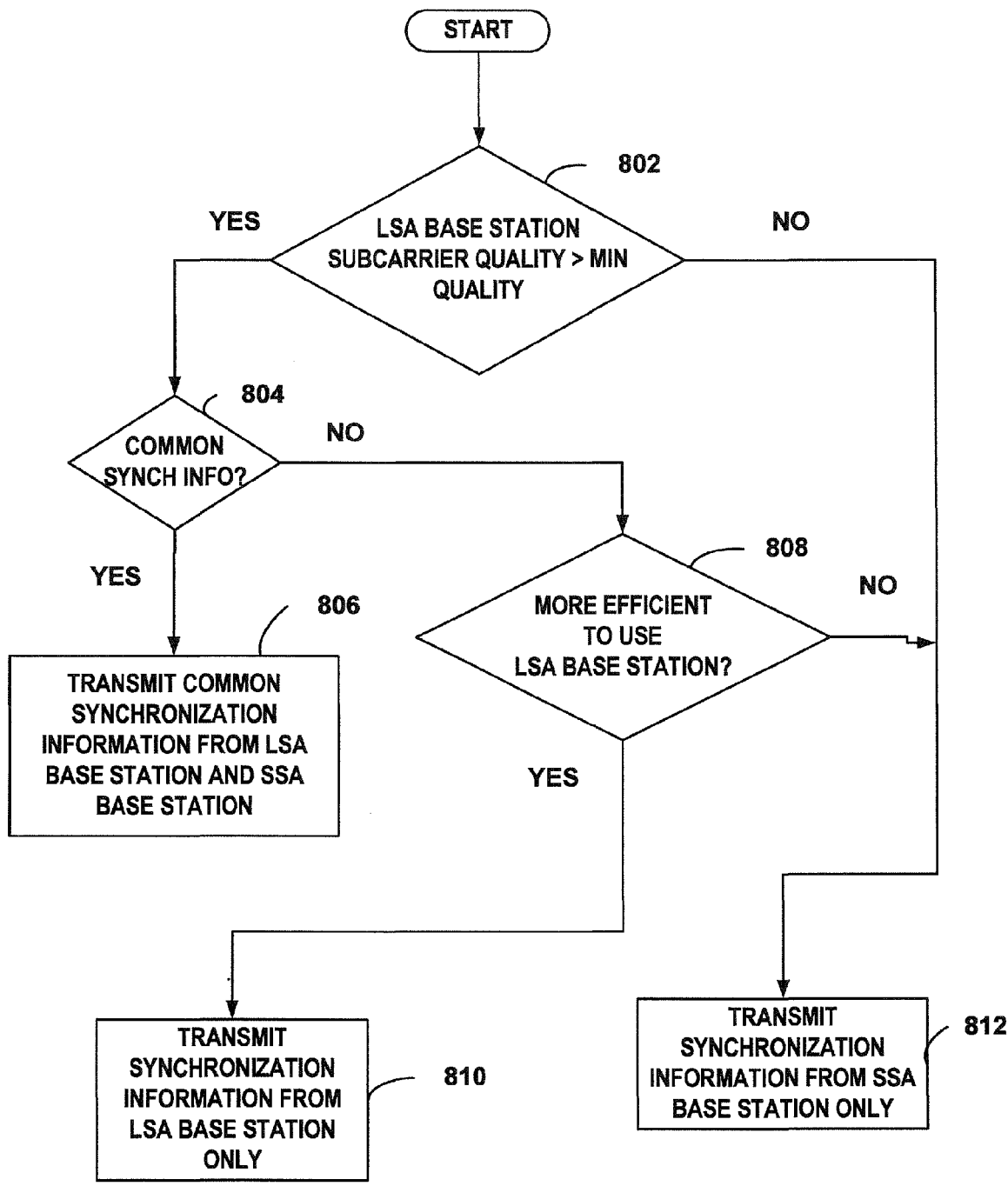
FIG. 8 is a flow chart of an example of a method for allocating transmission of synchronization information from multiple base stations within a communication system.

FIG. 8 is a flow chart of an example of a method for allocating transmission of synchronization information from multiple base stations within a communication system 100. The method discussed with reference to FIG. 8 facilitates management of communication with a mobile device within the overlap region 122. The method includes a decision process for a mobile device within the SSA coverage area that is also capable of receiving LSA base station downlink (DL) signals.

At step 802, it is determined whether the subcarriers transmitted from the LSA base station are received by the mobile communication device at a sufficient quality. The controller compares quality data such as BER, signal to noise (SNR) ratios or other parameters reported by the mobile communication device to a quality threshold. If the quality is no sufficient, the method proceeds to step 802, where the information is transmitted from the SSA base station. If the quality is sufficient, the method continues at step 804.

At step 804, it is determined whether the synchronization information to be transmitted is common synchronization information. The controller 132 determines if the information to be transmitted is contained within the logical synchronization channels of both the LSA base station and the SSA base station. If the information is not common information, the method proceeds to step 808. Otherwise, the method continues at step 806.

At step 806, the common synchronization information 101 is transmitted from both the SSA base station and the LSA base station. The controller 132 determines the appropriate weightings for each set of sub-carriers for transmission from each base station and transmits the common synchronization information 101.

At step 808, it is determined whether transmission of the information from the LSA base station is more efficient than transmission of the information from the SSA base station. If transmission is more efficient from the LSA base station, the method continues at step 810. Otherwise the method continues at step 812 where the synchronization information is transmitted only from the SSA base station.

At step 810, the information is transmitted only from the LSA base station. Accordingly, resources are efficiently allocated for transmitting of information based on the quality received signals at the mobile communication device, the relative efficiency transmission from each base station, and the type of information.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A system comprising:
a large service area (LSA) base station having a LSA geographical service area and configured to provide wireless communication service to first mobile communication devices;
a small service area (SSA) base station having a SSA geographical service area at least partially overlapping the LSA geographical service area to form an overlap service region, the SSA base station configured to provide wireless communication service to second mobile devices, wherein the first mobile communication devices and the second mobile communication devices are within the overlap region and require primary synchronization information to communicate with the LSA base station and the SSA base station; and
a controller configured to:
allocate transmission of the primary synchronization information from at least one of the LSA base station and the SSA base station over a physical channel having a transmission time defined by a communication specification and a transmission frequency defined by the communication specification, wherein, if both base stations are allocated to transmit the primary synchronization information, both base stations are allocated to transmit the primary synchronization information over the physical channel; and
assign a first transmission power weighting for transmitting the primary synchronization information from the LSA base station and a second transmission power weighting for transmitting the primary synchronization information from the SSA base station, the assigning of the first transmission power weighting and the second transmission power weighting at least partially based on a bit error rate (BER) of a combined signal representing the primary synchronization information at a receiving mobile communication device within the overlap service region, the BER measured after the receiving mobile communication device combines transmissions from the LSA base station and the SSA base station to generate the combined signal.

2. The system of claim 1, wherein the controller is further configured to allocate transmission of secondary synchronization information from at least one of the LSA base station and the SSA base station over a second physical channel having a second transmission time defined by a communication specification and a second transmission frequency defined by the communication specification, the secondary synchronization information required for communication with the LSA base station.

3. The system of claim 2, wherein the controller is further configured to allocate transmission of tertiary synchronization information from at least one of the LSA base station and the SSA base station over a third physical channel having a third transmission time defined by a communication specification and a third transmission frequency defined by the communication specification, the tertiary synchronization information required for communication with the SSA base station.

4. The system of claim 3, wherein the primary synchronization information allows for determining at least subframe-level timing of communications with the LSA base station and the SSA base station, the secondary synchronization information allows for determining at least frame-level timing of communications with the LSA base station and the tertiary synchronization information allows for determining at least frame-level timing of communications with the SSA base station.

5. The system of claim 1, wherein the BER is a predicted and calculated BER for mobile communication devices within the overlap region.

6. The system of claim 1, wherein the primary synchronization information is not allocated for transmission from the SSA base station and the SSA base station refrains from transmitting any signals over the physical channel.

7. A system comprising:
a large service area (LSA) base station having a LSA geographical service area and configured to provide wireless communication service to first mobile communication devices;
a small service area (SSA) base station having a SSA geographical service area at least partially overlapping the LSA geographical service area to form an overlap service region, the SSA base station configured to provide wireless communication service to second mobile devices, wherein the first mobile communication devices and the second mobile communication devices are within the overlap region, require primary synchronization information to communicate with the LSA base station and the SSA base station, require secondary synchronization information to communicate with the LSA base station and require tertiary synchronization information to communicate with the SSA base station; and
a controller configured to:
allocate transmission of the primary synchronization information from at least one of the LSA base station and the SSA base station over a first physical channel having a transmission time defined by a communication specification and a transmission frequency defined by the communication specification,
allocate transmission of the secondary synchronization information from the LSA base station over a second physical channel having a second transmission time defined by the communication specification and a second transmission frequency defined by the communication specification,
allocate transmission of the tertiary synchronization information from the SSA base station over a third physical channel having a third transmission time defined by the communication specification and a third transmission frequency defined by the communication specification, wherein, if both base stations are allocated to transmit the primary synchronization information, both base stations are allocated to transmit the primary synchronization information over the first physical channel; and
assign a first transmission power weighting for transmitting the primary synchronization information from the LSA base station and a second transmission power weighting for transmitting the primary synchronization information from the SSA base station, the assigning of the first transmission power weighting and the second transmission power weighting at least partially based on a bit error rate (BER) of a combined signal representing the primary synchronization information at a receiving mobile communication device within the overlap service region, the BER measured after the receiving mobile communication device combines transmissions from the LSA base station and the SSA base station to generate the combined signal.

8. The system of claim 7, wherein the BER is a predicted and calculated BER for mobile communication devices within the overlap region.

9. The system of claim 7, wherein the primary synchronization information is not allocated for transmission from the SSA base station and the SSA base station refrains from transmitting any signals over the physical channel.

10. A method comprising:
allocating transmission of primary synchronization information from at least one of a large service area (LSA) base station and a small service area (SSA) base station over a physical channel having a transmission time defined by a communication specification and a transmission frequency defined by the communication specification, the LSA base station having a LSA geographical service area and configured to provide wireless communication service to first mobile communication devices in an overlap service region, the SSA base station having a SSA geographical service area at least partially overlapping the LSA geographical service area to form the overlap service region, the SSA base station configured to provide wireless communication service to the second mobile communication devices in the overlap service region;
if both base stations are allocated to transmit common synchronization information, allocating both base stations to transmit the common synchronization information over the physical channel;
assigning, at least partially based on a bit error rate (BER) of a combined signal representing the primary synchronization information at a receiving mobile communication device within the overlap service region, a first transmission power weighting for transmitting the primary synchronization information from the LSA base station and a second transmission power weighting for transmitting the primary synchronization information from the SSA base station, the BER measured after the receiving mobile communication device combines transmissions from the LSA base station and the SSA base station to generate the combined signal; and transmitting the primary synchronization information in accordance with the allocation of transmission of primary synchronization information from at least one of the LSA base station and the SSA base station.

11. The method of claim 10, further comprising:

allocating transmission of secondary synchronization information from at least one of the LSA base station and the SSA base station over a second physical channel having a second transmission time defined by a communication specification and a second transmission frequency defined by the communication specification, the secondary synchronization information required for communication with the LSA base station.

12. The method of claim 11, further comprising allocating transmission of tertiary synchronization information from at least one of the LSA base station and the SSA base station over a third physical channel having a third transmission time defined by a communication specification and a third transmission frequency defined by the communication specification, the tertiary synchronization information required for communication with the SSA base station.

13. The method of claim 12, wherein the primary synchronization information allows for determining at least sub-frame-level timing of communications with the LSA base station and the SSA base station, the secondary synchronization information allows for determining at least frame-level timing of communications with the LSA base station and the tertiary synchronization information allows for determining at least frame-level timing of communications with the SSA base station.

14. The method of claim 10, wherein the BER is a predicted and calculated BER for mobile communication devices within the overlap region.

15. The method of claim 10, wherein the primary synchronization information is not allocated for transmission from the SSA base station and the SSA base station refrains from transmitting any signals over the physical channel.

* * * * *